United States Patent [19]
Hewitt

[11] Patent Number: 5,996,407
[45] Date of Patent: *Dec. 7, 1999

[54] MULTI-FREQUENCY ULTRASONIC LIQUID LEVEL GAUGING SYSTEM

[75] Inventor: Martin Hewitt, West Chester, Pa.

[73] Assignee: Parker-Hannifin Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,611

[22] Filed: Jun. 5, 1997

Related U.S. Application Data

[60] Provisional application No. 60/019,772, Jun. 14, 1996.

[51] Int. Cl.⁶ .................................................. G01F 23/284
[52] U.S. Cl. ........................................................ 073/290 V
[58] Field of Search ........................ 073/290 V; 367/908; 340/621

[56] References Cited

U.S. PATENT DOCUMENTS

| | | | |
|---|---|---|---|
| 2,753,542 | 7/1956 | Rod et al. | 73/290 V |
| 3,110,890 | 11/1963 | Westcott et al. | 340/621 |
| 3,693,445 | 9/1972 | Johnson | 73/290 V |
| 3,745,829 | 10/1972 | Franchi | 073/290 V |
| 4,210,969 | 7/1980 | Massa | 367/108 |
| 4,815,323 | 3/1989 | Ellinger et al. | 073/290 V |
| 5,095,748 | 3/1992 | Gregory et al. | 73/290 V |
| 5,124,933 | 6/1992 | Maier | 364/509 |

FOREIGN PATENT DOCUMENTS

| | | | |
|---|---|---|---|
| 777 112 A1 | 6/1997 | European Pat. Off. | |
| 2-95246 | 4/1990 | Japan . | |
| 6-249697 | 9/1994 | Japan | 73/290 V |
| 2 100 429 | 12/1982 | United Kingdom . | |

*Primary Examiner*—Hezron Williams
*Assistant Examiner*—Willie Morris Worth
*Attorney, Agent, or Firm*—Christopher H. Hunter

[57] ABSTRACT

A multi-frequency ultrasonic liquid level gauging system includes a storage apparatus for storing a volume of liquid and a plurality of ultrasonic transducers. Each transducer introduces a distinct ultrasonic signal into storage apparatus and receives a reflected signal back. A circuit drives and receives signals from the ultrasonic transducers. A processor calculates the liquid level at each of the locations of ultrasonic transducers based on the reflected signal received from each transducer. Transducers are connected in parallel, thereby allowing circuit to communicate to the transducers through a single conductive path. A method of measuring a liquid level in storage apparatus includes emitting a single drive signal to a plurality of ultrasonic signal sources, wherein each source is operable to transmit ultrasonic signals having unique frequencies. The ultrasonic signals are transmitted through liquid and each is reflected at the liquid surface. The reflected signals also have unique frequencies and are communicated to processor. The reflected signals are distinguished and the depth of the liquid level at various storage apparatus locations is calculated from each of the distinguished reflected signals. The depth of liquid is a function of the propagation time of each signal through the liquid.

27 Claims, 4 Drawing Sheets

MULTI-FREQUENCY ULTRASONIC LIQUID LEVEL GAUGING SYSTEM

This application claims the benefit of prior U.S. Provisional Application No. 60/019,772 filed Jun. 14, 1996, entitled "Multi-Frequency Ultrasonic Liquid Level Gauging System"

TECHNICAL FIELD OF THE INVENTION

The present invention relates generally to systems for the detection of fluid levels, and more particularly to a multi-frequency ultrasonic liquid level gauging system for detecting liquid levels in storage tanks.

BACKGROUND OF THE INVENTION

Various systems for detecting the liquid level in a storage tank have been utilized in the past. In one measuring system a capacitance probe is used to measure the liquid level in storage tanks. The capacitance probe relies upon the dielectric difference between the liquid and air in the storage tank. The capacitance probe is mounted vertically in the storage tank and the liquid level (and consequently the quantity of liquid in the tank) is periodically measured by a processor connected to the capacitance probe. Such capacitance systems commonly employ multiple probes, wired in parallel, particularly in large or irregularly-shaped tanks. It can be difficult to determine the contribution of each probe to the overall liquid level measurement. One solution is to individually wire each probe to its associated electronics. However, this can increase the cost and weight of the system.

Another measuring system works upon the principle of transmitting an ultrasonic signal from a signal source through the liquid. For example, FIG. 1 is a diagram of a tank 10 and a sensing portion 12 of a known multiple-probe ultrasonic level gauge system. The sensing portion 12 includes a number of probes 14a–14d oriented perpendicular with respect to the bottom surface 18 of tank. Each probe 14a–14d includes a stillwell 16a–16d and an ultrasonic transducer 20a–20d, respectively, located at the bottom of each stillwell. A remote processing system (not shown) separately excites and receives signals from each transducer 20a–20d over a dedicated wire pair 22a–22d. To sense the level 24 of liquid 26 in the tank 10 a drive pulse is transmitted to each transducer 20a–20d over an associated wire pair 22a–22d causing each transducer to generate an ultrasonic signal which propagates from the transducer 20 toward the surface 24 of liquid 26. The ultrasonic signal reflects off of the interface of the liquid 26 and air 28 which is the surface 24 of the liquid and propagates back to the transducer 20. Knowing the speed of sound through the particular liquid 26 and the measured time for the ultrasonic signal to propagate from a transducer 20 to the surface 24 of liquid 26 and back, the depth of the liquid in storage tank 10 can be calculated.

While such a system is able to differentiate signals from the separate transducers by virtue of the dedicated wire pairs, the overhead of routing the individual wiring from each transducer to the remote processing system can again add to the cost and weight of the liquid level measuring system. In aviation-type fuel tanks the weight of a liquid level gauging system can be an important design constraint.

In view of the above mentioned shortcomings of conventional liquid level measuring systems, it is believed that there is a demand in the market for an ultrasonic system which is lightweight and inexpensive, and which permits mapping of the liquid level in the tank.

SUMMARY OF THE INVENTION

A multi-frequency ultrasonic liquid level gauging system is provided which includes a storage apparatus, such as a tank, for storing a quantity of liquid, such as fuel, and a plurality of probes, each of which includes a stillwell with an ultrasonic transducer located at the bottom of the stillwell. Each of the ultrasonic transducers operates at a different frequency, and is connected to a remote processing system over shared wiring. Such a connection reduces the cost and weight of wiring overhead in the system.

A method of measuring a liquid level in a storage apparatus is also provided which includes emitting a single drive signal to a plurality of ultrasonic signal sources, wherein each source is operable to transmit an ultrasonic signal having a unique frequency. The unique ultrasonic signals are transmitted through the liquid. The reflected signals are distinguished and the depth of the liquid level at various storage apparatus locations is calculated from each of the distinguished reflected signals. The depth of the liquid is a function of the propagation time of each signal through the liquid.

DETAILED DESCRIPTION OF THE INVENTION

Figure 1:
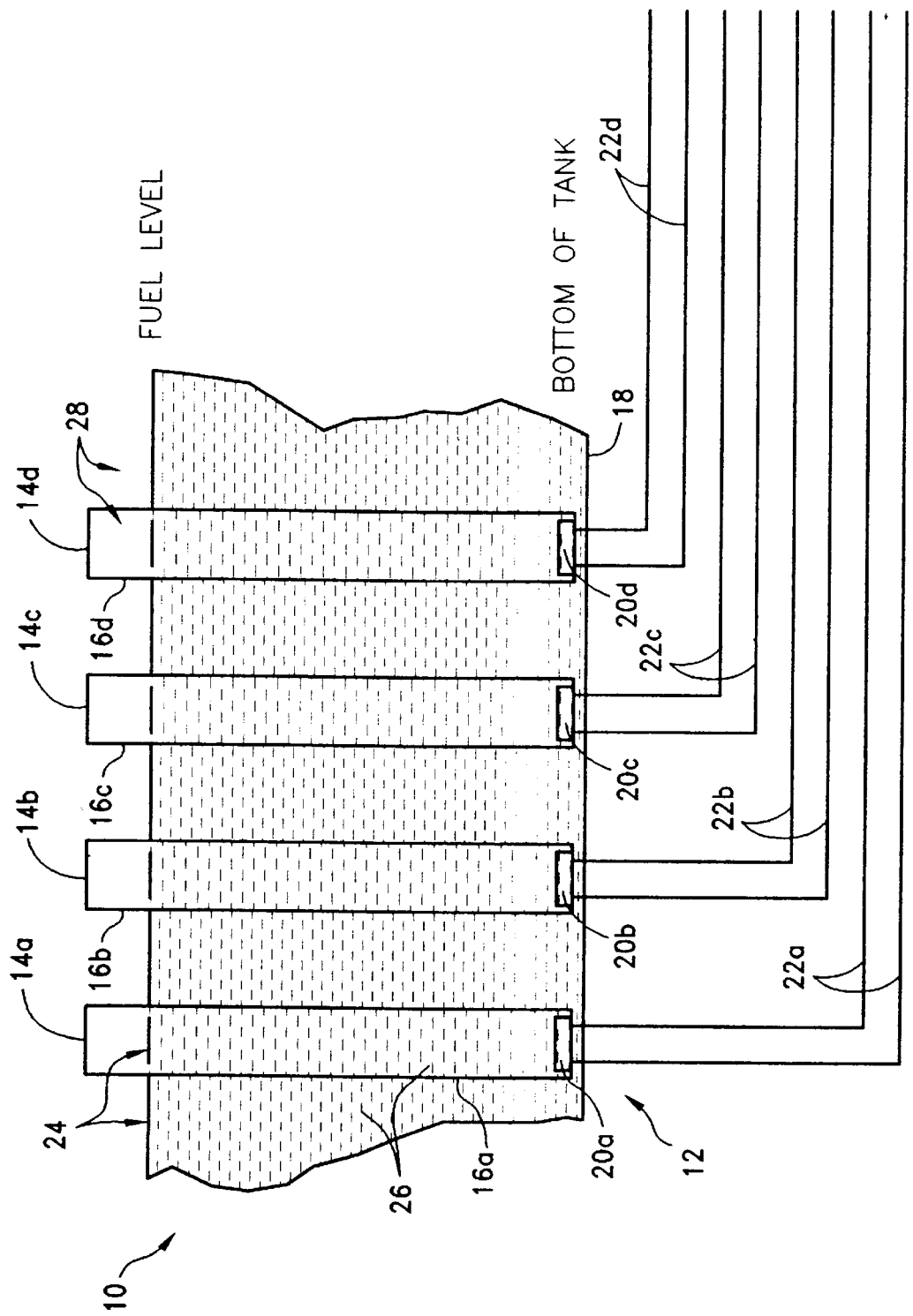
FIG. 1 is a cross-sectional diagram illustrating a tank and a prior art ultrasonic liquid level gauging system.
Figure 2:
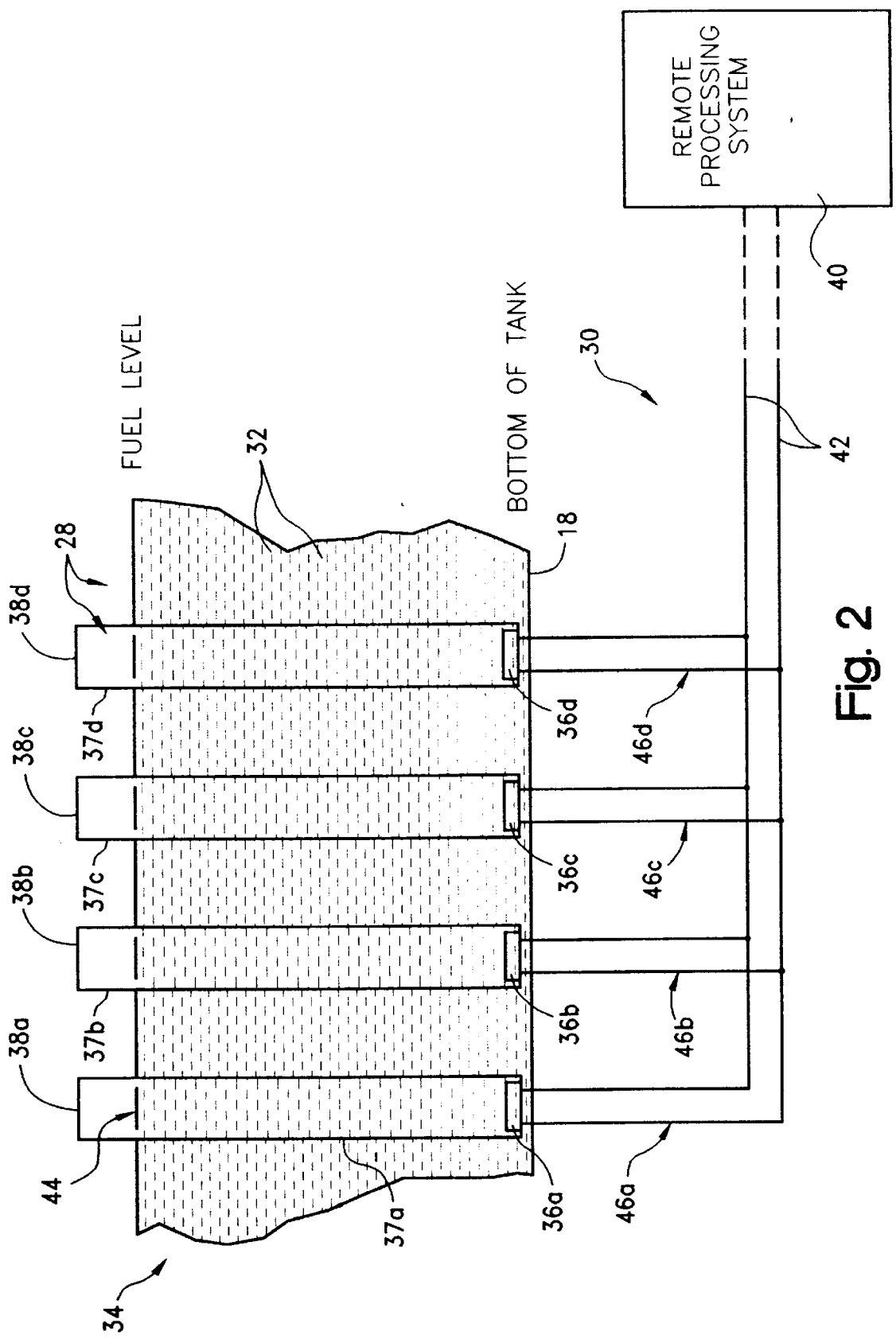
FIG. 2 is a cross-sectional diagram illustrating a tank with a ultrasonic liquid level gauging system constructed according to a first embodiment of the present invention.

With reference to FIG. 2, there is shown a liquid level gauging system 30 in accordance with a first embodiment the present invention for gauging the level of a liquid 32, such as fuel, in a storage tank 34. The liquid level gauging system 30 includes a number of probes 38a–38d, each of which includes a transducer 36a–36d, respectively, situated for monitoring the level of liquid at various locations, for example within stillwells 37a–37d. A "stillwell" is recognized by those skilled in the art as a narrow, constant-diameter tube extending from the bottom of the tank to the top of the tank, with openings near or at the bottom for allowing liquid to enter and equalize within the stillwell. The stillwell provides a quiet, sheltered area for the accurate measurement of the level of the liquid. The transducers 36a–36d preferably operate and communicate with a remote processing system 40 at distinct signal frequencies over one or more shared wiring pairs 42.

In operation, the remote processing system 40 drives each of the transducers 36a–36d over the shared wiring pair 42 coupled to each transducer. In response to the drive signal from the remote processing system 40, each transducer propagates a distinct ultrasonic signal through the liquid 32 in the tank 34. The ultrasonic signals reflected from the liquid/air interface 44 are sensed by the corresponding transducers which communicate the signals to the remote processing system 40 over a wiring pair shared by at least two transducers. Based on the time required for the signal to propagate through the liquid 32 in the tank 34, the remote processing system calculates the liquid level 44 in the tank. By employing transducers operating at different frequencies, multiple transducers of the gauging system can be coupled to the remote processing system over a shared wiring pair, i.e., in parallel, thereby permitting a lightweight and inexpensive liquid level gauging solution while maintaining a unique frequency signature for each transducer. Consequently, independent data on liquid levels can be obtained throughout the storage tank.

It is noted that although in this particular embodiment transducers 36a–36d are located within tank 34, alternative embodiments may utilize transducers located external to the tank, such as operational through ports in the tank. Moreover, while each transducer 36–36d is shown coupled in parallel to a single shared wiring pair 42 via wiring pairs 46a–46d, in some embodiments, more than a single shared wiring pair 42 may be employed.

Figure 3:
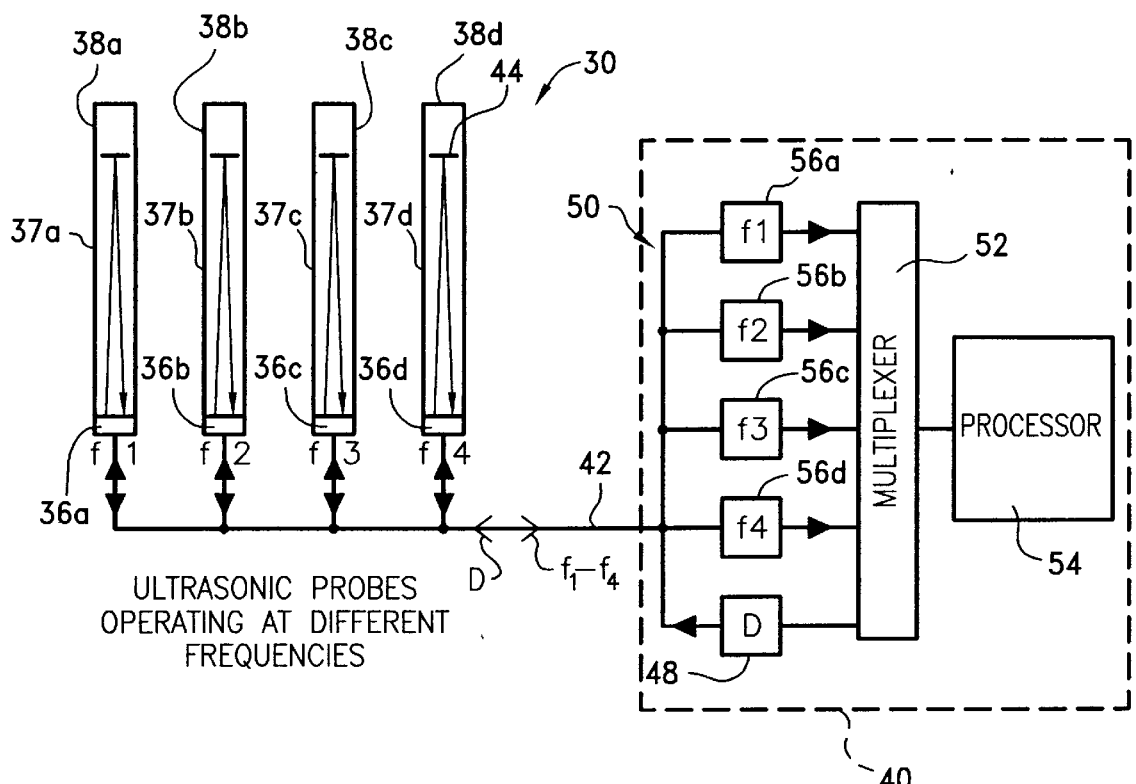
FIG. 3 is a cross-sectional diagram detailing the remote processing apparatus of the liquid level gauging system of FIG. 2.

FIG. 3 schematically illustrates the liquid level gauge 30 with the remote processing system 40 shown in detail. The remote processing system 40 includes a driver 48 and filter network 50 coupled to a multiplexer 52 which in turn is coupled to a processor 54. The filter network 50 includes a plurality of filters 56a–56d corresponding to the transducers 36a–36d, respectively, operating at frequencies f1–f4, respectively. Driver 48, via multiplexer 52 and processor 54, drives transducers 36a–36d located within stillwells 37a–37d. Processor 54 operates in conjunction with multiplexer 52 such that it can select either driver 48 to excite and therefore transmit ultrasonic signals in each of transducers 36a–36d, or receive data that has been received from the transducers through filters 56a–56d. The remote processing system 40 employs processor 54 in conjunction with multiplexer 52, driver 48, and filters 56a–56d to transmit and receive information via a shared path 42 to transducers 36a–36d. In a preferred embodiment the shared path is a twisted wire pair. In alternative embodiments, however, the shared path may consist of a bus or any other type conductor that is operable to transmit electrical signals. Although FIG. 3 illustrates an exemplary embodiment having four transducers and filters, the invention could be utilized with any number of transducers and filters. The operation of remote processing system 40 in conjunction with transducers 36a–36d of probes 38a–38d may be better understood in conjunction with FIG. 4.

Figure 4:
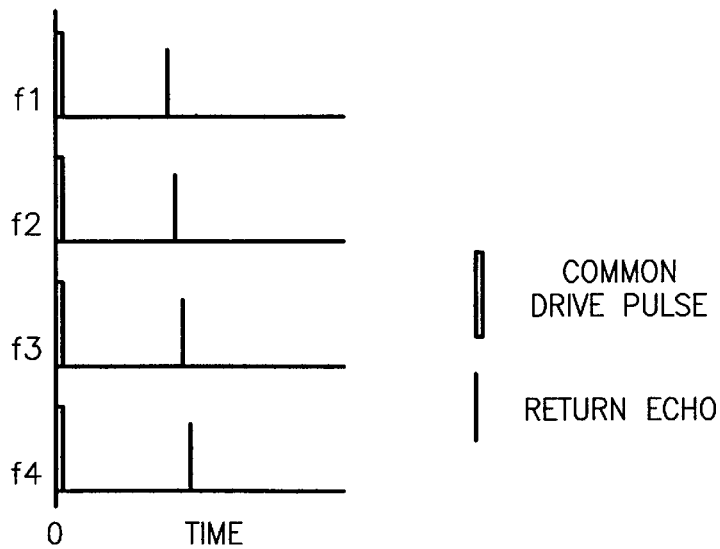
FIG. 4 is a timing graph illustrating the amplitude response of the transmitted and reflected signal of the transducers in the liquid level gauging system of FIG. 2.

FIG. 4 illustrates a timing diagram for each signal, illustrated as signals f1–f4, received from the transducers 36a–36d having an amplitude response with respect to time. Processor 54, in conjunction with multiplexer 52, selects driver 48 to excite transducers 36a–36d with a square wave pulse. In one embodiment, transducers 36a–36d may consist of crystals, each having a unique resonant frequency. Therefore, when driver 48 excites the plurality of transducers with a square wave pulse (which contains all the frequencies in the frequency domain), each transducer emits an ultrasonic signal having a unique frequency wherein the frequency is a function of the resonant frequency of that transducer.

For example, transducer 36a in stillwell 37a may have a resonant frequency of 1 Mhz wherein the transducer 36b in stillwell 37b may have a resonant frequency of 1.1 Mhz. Transducers 36c and 36d likewise have their own unique resonant frequencies. The transducer having a resonant frequency of 1 Mhz will therefore emit an ultrasonic signal having a frequency of 1 Mhz. The ultrasonic signal propagates through the liquid 32 within tank 34 and reaches the interface 44 between the liquid and the air. The ultrasonic signal reflects off the interface 44 and is subsequently received by transducer 36a. (Since a single square wave drive signal from driver 48 will excite an ultrasonic signal in each transducer 36a–36d, each transducer will receive a reflected ultrasonic signal having a unique frequency associated with the crystal in that transducer.) Each reflected signal is then communicated back to remote processing system 40 via shared path 42. The plurality of filters 56a–56d subsequently filter the reflected signals.

Consider, as an example, filter 56a associated with transducer 36a of probe 38a. Since the resonant frequency of the transducer 36a is 1 Mhz, the filter 56a may preferably consist of a band-pass filter centered around the frequency 1 Mhz. Filter 56a will distinguish that reflected signal from the other reflected signals in the parallel configuration. Filters 56b–56d provide similar functionality. In alternative embodiments, filters 56a–56d may consist of any type of filtration arrangement that effectively distinguishes each signal from the plurality of reflected signals. Multiplexer 52 then selects, according to commands from processor 54, the information to be passed to processor 54.

In many storage tanks the liquid level depth will be substantially uniform throughout the tank. Therefore, the amplitude response will be similar to that illustrated in FIG. 4. Because the depth of the liquid is proportional to the propagation time through the liquid, deviations in the amplitude/time response may be attributed to a different liquid level depth, an irregularity in the storage tank or thermal variances throughout the liquid. Many storage tanks, however, have irregular shapes. For example, in aviation applications, a fuel storage tank generally assumes the shape of the wing of its respective aircraft. Processor 54 can map depth calculations of each individual transducer since each transducer has its own unique frequency signature. Therefore, although the plurality of reflected signals may substantially overlap one another in the time domain, they are distinguishable in the frequency domain. Filters 56a–56d allow for the filtration of each signal to provide processor 54 a clear signal response for subsequent calculation of the liquid level.

Figure 5:
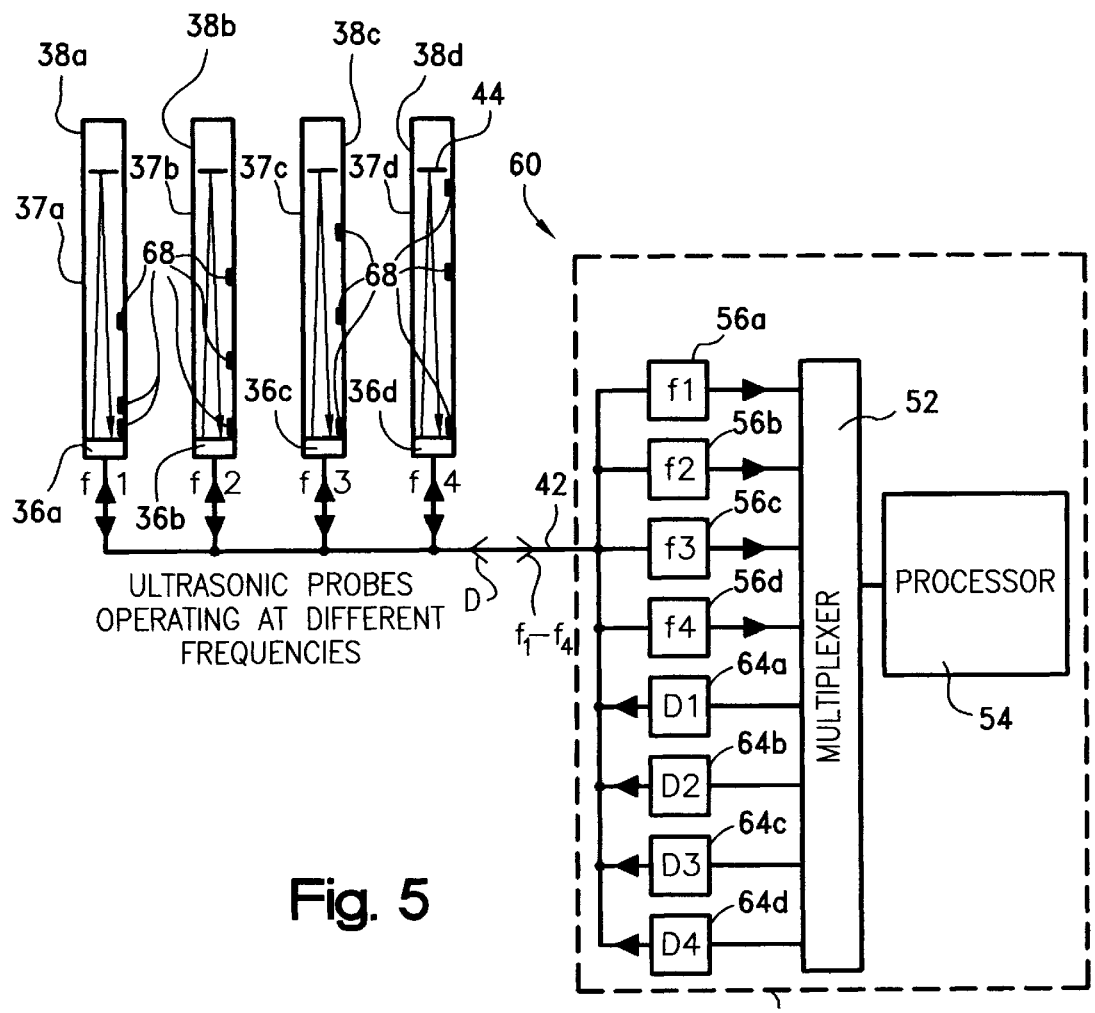
FIG. 5 is a cross-sectional diagram detailing the remote processing apparatus of an ultrasonic liquid gauging system constructed according to a second embodiment of the present invention.

FIG. 5 illustrates an alternative embodiment of the present invention with a liquid level gauge system 60. Liquid level gauging system 60 is similar to system 20 of FIG. 3 in that it includes a plurality of transducers 36a–36d located in stillwells 37a–37d of probes 38a–38d. In addition, transducers 36a–36d are connected in parallel along wiring pair 42. According to this embodiment, a remote processing system 62 contains multiplexer 52, processor 54 and a plurality of filters 56a–56d as in the first embodiment, and further includes a plurality of drivers 64a–64d. Instead of a single driver 48 exciting transducers 36a–36d collectively as in system 30 of FIG. 3, the plurality of drivers 64a–64d individually excite or drive each transducer. For example, driver 64a drives transducer 36a located within stillwell 37a, while each of the remaining drivers 64b–64d drive their respective transducers 36b–36d.

Figure 6:
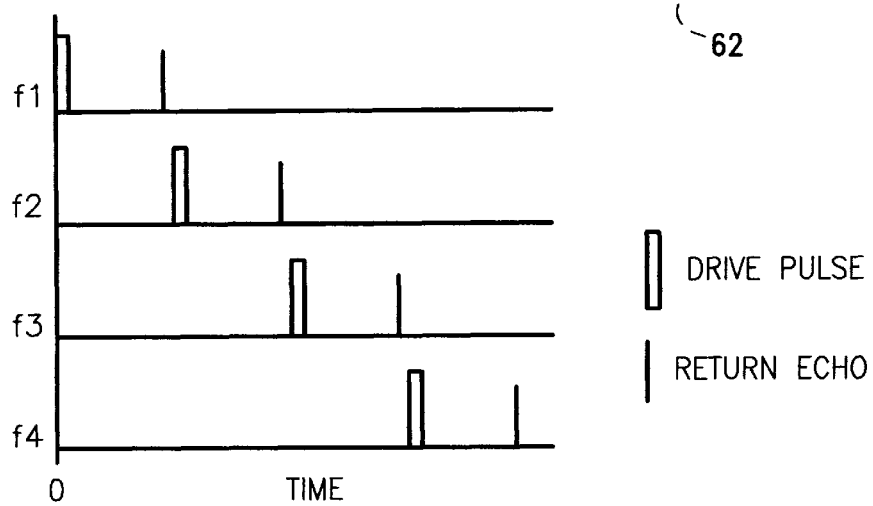
FIG. 6 is a timing graph illustrating the amplitude response of the transmitted and reflected signal of the transducers in the liquid level gauging system of FIG. 5.

Gauging system 60, like gauging system 30 of FIG. 3, embodies the advantages of parallel systems with the advantage of maintaining the unique signature of each transducer. The operation of gauging system 60 may best be understood in conjunction with FIG. 6. FIG. 6 illustrates a graph showing an amplitude response for each reflected signal from the plurality of transducers with respect to time. Although FIG. 6 illustrates the excitation and echo (reflected signal) wave forms occurring at different times, this is not required by gauging system 60. Rather, instead of drivers 64a–64d emitting square wave pulses, as did driver 48 of FIG. 3, drivers 64a–64d can each emit sinusoidal signals having a particular frequency that matches a unique resonant frequency of a particular transducer. (FIG. 6 illustrates the various drive pulses as square wave for ease of illustration. Each drive pulse is actually sinusoidal and occupies a unique frequency.) For example, driver 64a (in this exemplary embodiment) emits a sinusoidal signal having a frequency of 1 Mhz to selectively drive transducer 36a which has a resonant frequency of 1 Mhz. None of the remaining transducers will be excited because their resonant frequencies are different. Therefore each driver 64a–64d drives only a single transducer independently of when the other drivers are operating. Filters 56a–56d receive each reflected signal and distinguish the signal through bandpass filtration. Although bandpass filtration is particularly disclosed in this particular embodiment, other forms of filtration may be utilized and would constitute alternative embodiments of the invention. As discussed relative to FIG. 3, processor 54 receives the filtered signals and calculates liquid levels proximate to each respective transducer.

FIG. 6 illustrates, as one example, each transducer being driven sequentially with respect to time. In such an example, filtration would not be required to differentiate various signals on the single conductive path. The invention contemplates such an alternative embodiment which eliminates such filtration. Gauging system 60 of FIG. 5, however, need not operate sequentially but could drive transducers 36a–36d simultaneously. In such an example, each transducer would still be individually excited and filters 56a–56d would distinguish the unique frequency responses that may be indistinguishable in the time domain.

In another aspect of the invention, a procedure for calibration of the liquid level gauging system may be incorporated with gauging system 30 of FIG. 3 or gauging system 60 of FIG. 5. The purpose of executing a calibration procedure is to correct for variations in the speed of sound in fuel for the calculation methodology executed by processor 54. The method of calibration may be a function of the application or shape of the storage tank. In a simple storage tank such as an underground fuel tank, for example, a single calibration pin may be used for the entire tank. Alternatively, a multiple pin calibration technique can be used. For example, as illustrated in FIG. 5, multiple calibration pins 68 can be placed vertically along the sidewall of each stillwell. (In alternative embodiments that do not utilize stillwells, multiple calibration pins could be placed vertically along a sidewall of the storage tank). The distance between each transducer and their respective vertically-located calibration pins is a known distance. Ultrasonic signals are emitted from the transducers and reflect upon each calibration pin in its respective stillwell. Processor 54 then collects the data and compares its measured distances between the transducers and their respective calibration pins with the known distances. The comparison is then used either to validate or modify the calculation methodology of processor 54.

In a still further aspect of the invention, the liquid level in a storage tank can be determined when the temperature throughout the liquid is not uniform. It is important to note that since the speed of sound through a liquid is a function of the temperature of the liquid, utilizing multiple calibration pins vertically along each stillwell allows processor 54 to construct an approximate vertical thermal gradient of the liquid in the tank by identifying the effect of temperature throughout the liquid. Processor 54 may then use the thermal effect information in calculating the liquid level depth in the storage tank. Construction of a thermal gradient by processor 54 is advantageous in aviation-type applications. Fuel storage tanks are often located in the wing of an aircraft. As an aircraft is in flight, the temperatures at high altitudes may vary significantly. Consequently, the air passing a respective wing will cool the upper and lower portions of a fuel tank at a higher rate than the central portion of the tank. It is therefore common for a substantial thermal gradient to exist vertically in an aircraft fuel storage tank. The above-mentioned calibration procedure allows processor 54 to accurately identify the thermal effects on the fluid in the storage tank and provide an accurate calculation of the liquid level in the storage tank.

Gauging system 30 of FIG. 3 and gauging system 60 of FIG. 5 each advantageously simplify the wiring of multi-sensor or multi-transducer gauging systems by allowing transducers to be coupled together in parallel, thereby reducing multiple-twisted wire pairs between the transducers and associated electronics to a single-twisted wire pair. This reduction in wiring overhead substantially reduces the space and weight of the liquid level gauging system. Additionally, the reduction in wiring overhead results in increased system reliability by decreasing the number of pieces of needed equipment. In another alternative embodiment, one could utilize a second-wire pair, which could be selectively coupled to remote processing systems 40 and 62 of FIGS. 3 and 5, to enhance fault survival of the liquid level gauging system.

Gauging system 30 of FIG. 3 and gauging system 60 of FIG. 5 also advantageously provide for individual identification of each transducer through use of a unique frequency signature for each transducer. Processor 54 can therefore identify each transducer when coupled together in parallel without the wiring overhead required by prior art systems where each probe was individually coupled to the electronics. Processor 54 may map the liquid level throughout the tank while simultaneously having the transducers coupled together in parallel. Further, use of calibration pins allows processor 54 to accurately gauge the actual propagation rate of sound through the liquid, thereby characterizing the liquid and identifying the thermal effects on the liquid. Such characterization and identification provide accuracy in liquid level calculations.

Although the invention has been shown and described with respect to a preferred embodiment and a number of alternative embodiments, it is evident that equivalent alterations and modifications will occur to others skilled in the art upon reading and understanding this specification. The present invention includes all such equivalent alterations and modifications; such equivalent alterations should be understood to fall within the scope of the appended claims.

What is claimed is:

1. An ultrasonic liquid level gauging system, comprising:
   a storage apparatus for storing a volume of liquid and a volume of gas above the liquid;
   a plurality of ultrasonic transducers connected in parallel, each transducer located for introducing a distinct ultrasonic signal at a distinct frequency relative to the other transducers into the liquid of the storage apparatus and receiving a reflected signal from the liquid-gas interface;

a circuit for driving the ultrasonic transducers and receiving reflected signals from the transducers through a single transmission path; and a processor in communication with the circuit which calculates the liquid level at each of the locations of the ultrasonic transducers based on the reflected signal received from each transducer by the circuit.

2. The system of claim 1, wherein the plurality of transducers communicate with the circuit over a shared wiring configuration.

3. The system of claim 1, wherein the transducers are each individually located toward the bottom of respective stillwells, with each transducer configured to direct the ultrasonic signal upwardly toward the liquid-gas interface within a respective stillwell.

4. The system of claim 3, further including a calibrator located within each stillwell.

5. An ultrasonic liquid level gauging system, comprising:

a storage apparatus for storing a volume of liquid and a volume of gas above the liquid;

a plurality of ultrasonic transducers connected in parallel, each transducer located for introducing a distinct ultrasonic signal at a distinct frequency into the liquid of the storage apparatus and receiving a reflected signal from the liquid-gas interface;

a circuit for driving the ultrasonic transducers and receiving reflected signals from the transducers through a single transmission path, the circuit for driving the ultrasonic transducers and for receiving signals from the transducers comprising: (i) a drive circuit operable to drive the transducers collectively with a single drive signal; and (ii) a filter network, wherein the filter network is operable to distinguish the reflected signals from one another for subsequent calculation of liquid level at each of the locations of the transducers; and a processor in communication with the circuit which calculates the liquid level at each of the locations of the ultrasonic transducers based on the reflected signal received from each transducer by the circuit.

6. The system of claim 5, wherein the filter network comprises a plurality of bandpass filters, wherein each of the bandpass filters distinguishes one of the reflected ultrasonic signals of a particular frequency.

7. An ultrasonic liquid level gauging system, comprising:

a storage apparatus for storing a volume of liquid and a volume of gas above the liquid;

a plurality of ultrasonic transducers connected in parallel, each transducer located for introducing a distinct ultrasonic signal at a distinct frequency into the liquid of the storage apparatus and receiving a reflected signal from the liquid-gas interface;

a circuit for driving the ultrasonic transducers and receiving reflected signals from the transducers through a single transmission path, the circuit for driving the ultrasonic transducers driving the transducers collectively; and a processor in communication with the circuit which calculates the liquid level at each of the locations of the ultrasonic transducers based on the reflected signal received from each transducer by the circuit.

8. The system of claim 1, wherein the circuit for driving the ultrasonic transducers drives the plurality of transducers separately.

9. A method of measuring a liquid level in a storage apparatus having a volume of liquid and a volume of gas above the liquid, comprising the steps of:

transmitting a drive signal to a plurality of ultrasonic signal sources, wherein each of the plurality of sources is operable to transmit ultrasonic signals having unique frequencies relative to the other sources;

transmitting a plurality of ultrasonic signals at such unique frequencies from the sources through the liquid toward the gas, wherein each signal may be reflected in the liquid at the liquid-gas interface, thereby creating a plurality of reflected signals, wherein each reflected signal has a unique frequency corresponding to its respective source;

communicating the reflected signals to a processor;

distinguishing each of the plurality of reflected signals; and calculating the depth of the liquid level at various storage apparatus locations from each of the distinguished reflected signals, wherein the depth of the liquid is a function of the propagation time of each signal through the liquid.

10. A method of measuring a liquid level in a storage apparatus having a volume of liquid and a volume of gas above the liquid, comprising the steps of:

transmitting a drive signal to a plurality of ultrasonic signal sources, wherein each of the plurality of sources is operable to transmit ultrasonic signals having unique frequencies;

transmitting a plurality of ultrasonic signals from the sources through the liquid toward the gas, wherein each signal may be reflected in the liquid at the liquid-gas interface, thereby creating a plurality of reflected signals, wherein each reflected signal has a unique frequency corresponding to its respective source;

communicating the reflected signals to a processor;

distinguishing each of the plurality of reflected signals, the step of distinguishing comprising the steps of:

transmitting the reflected signals through a filter network, wherein the filter network has a plurality of channels;

selectively eliminating reflected signals in each channel that have frequencies outside a preselected frequency band, thereby allowing filtration of each reflected signal corresponding to a respective ultrasonic signal transmission from the plurality of reflected signals; and transmitting the filtered signals to the processor; and calculating the depth of the liquid level at various storage apparatus locations from each of the distinguished reflected signals, wherein the depth of the liquid is a function of the propagation time of each signal through the liquid.

11. The method of claim 9, wherein the step of calculating comprises the steps of:

characterizing the type of liquid through which the ultrasonic signals are propagating;

identifying thermal effects upon the rate of propagation of sound throughout the volume of the liquid;

measuring the time duration for each of the plurality of ultrasonic signals to transmit and reflect through the liquid; and calculating the depth of the fluid at each point as a function of the type of liquid, temperature of the liquid and propagation time through the liquid.

12. An ultrasonic gauging system for determining a liquid level in a storage apparatus, with a volume of air being provided above the liquid in the storage apparatus, the gauging system comprising:

a plurality of ultrasonic transducers connected in parallel and disposed at predetermined locations around the storage apparatus, each transducer introducing a distinct ultrasonic signal at a distinct frequency relative to the other transducers at the bottom of the storage apparatus upwardly into the liquid in the storage apparatus toward the volume of air, and receiving a reflected signal from the liquid-air interface;

a circuit for driving the ultrasonic transducers and receiving reflected signals from the transducers through a single transmission path; and a processor in communication with the circuit which calculates the liquid level at each of the locations of the ultrasonic transducers based on the reflected signal received by the circuit from each transducer.

13. An ultrasonic gauging system for determining a liquid level in a storage apparatus, with a volume of air being provided above the liquid in the storage apparatus, the gauging system comprising:

a plurality of ultrasonic transducers connected in parallel and disposed at predetermined locations around the storage apparatus, each transducer introducing a distinct ultrasonic signal at a distinct frequency with respect to the other transducers at the bottom of the storage apparatus upwardly into the liquid in the storage apparatus toward the volume of air, and receiving a reflected signal from the liquid-air interface;

a circuit for driving the ultrasonic transducers and receiving reflected signals from the transducers through a single transmission path, the circuit for driving the ultrasonic transducers and for receiving signals from the transducers comprising: (i) a drive circuit operable to drive the transducers collectively with a single drive signal; and (ii) a filter network, wherein the filter network is operable to distinguish the reflected signals from one another for subsequent calculation of liquid level at each of the locations of the transducers; and a processor in communication with the circuit which calculates the liquid level at each of the locations of the ultrasonic transducers based on the reflected signal received by the circuit from each transducer.

14. An ultrasonic gauging system for determining a liquid level in a storage apparatus, with a volume of air being provided above the liquid in the storage apparatus, the gauging system comprising:

a plurality of ultrasonic transducers connected in parallel and disposed at predetermined locations around the storage apparatus, each transducer introducing a distinct ultrasonic signal at a distinct frequency with respect to the other transducers at the bottom of the storage apparatus upwardly into the liquid in the storage apparatus toward the volume of air, and receiving a reflected signal from the liquid-air interface;

a circuit for driving the ultrasonic transducers and receiving reflected signals from the transducers through a single transmission path, the circuit for driving the ultrasonic transducers and for receiving signals from the transducers comprising: (i) a drive circuit operable to drive the transducers separately with a separate drive signals; and (ii) a filter network, wherein the filter network is operable to distinguish the reflected signals from one another for subsequent calculation of liquid level at each of the locations of the transducers; and a processor in communication with the circuit which calculates the liquid level at each of the locations of the ultrasonic transducers based on the reflected signal received by the circuit from each transducer.

15. An ultrasonic gauging system for determining a liquid level in a storage apparatus with a volume of gas being provided directly above the liquid in the storage apparatus, the gauging system, comprising:

a plurality of ultrasonic transmitting and receiving means connected in parallel and disposed at predetermined locations around the storage apparatus for introducing distinct ultrasonic signals at different frequencies relative to one another into the liquid in the storage apparatus and receiving a reflected signal from the liquid-gas interface;

a circuit for driving the transmitting and receiving means and receiving reflected signals from the transmitting and receiving means through a single transmission path; and processor means in communication with the circuit for calculating the liquid level at each of the locations of the transmitting and receiving means based on the reflected signal received by the circuit from each transmitting and receiving means.

16. The system as in claim 15, further including a plurality of probes located within the storage apparatus, each of said probes including a single ultrasonic transmitting and receiving means.

17. The system of claim 1, wherein each transducer is disposed at the bottom of the storage apparatus, and introduces a distinct ultrasonic signal into the liquid upwardly toward the gas from the bottom of the storage apparatus, and receives a reflected signal from the liquid-gas interface.

18. The system as in claim 15, wherein each ultrasonic transmitting and receiving means is disposed at the bottom of the storage apparatus, and introduces a distinct ultrasonic signal into the liquid upwardly toward the gas from the bottom of the storage apparatus, and receives a reflected signal from the liquid-gas interface.

19. The system of claim 1, wherein the circuit for driving the ultrasonic transducers and for receiving signals from the transducers comprises: (i) a drive circuit operable to drive the transducers separately with separate drive signals; and (ii) a filter network, wherein the filter network is operable to distinguish the reflected signals from one another for subsequent calculation of liquid level at each of the locations of the transducers.

20. The method as in claim 9, wherein the step of transmitting the drive signal comprises transmitting the drive signal across a single transmission path to collectively drive the plurality of ultrasonic signal sources.

21. The method of claim 9, wherein the step of transmitting the drive signal comprises transmitting separate drive signals across a single transmission path to separately drive the plurality of ultrasonic signal sources.

22. The system of claim 12, wherein the circuit for driving the ultrasonic transducers drives the plurality of transducers collectively.

23. The system as in claim 12, wherein the circuit for driving the ultrasonic transducers and for receiving signals from the transducers comprises: (i) a drive circuit operable to drive the transducers with at least one drive signal; and (ii) a filter network, wherein the filter network is operable to distinguish the reflected signals from one another for subsequent calculation of liquid level at each of the locations of the transducers.

24. The system as in claim 15, wherein the circuit comprises: (i) a drive circuit operable to drive the transmitting and receiving means collectively with a single drive signal; and (ii) a filter network, wherein the filter network is operable to distinguish the reflected signals from one another for subsequent calculation of liquid level at each of the locations of the transmitting and receiving means.

25. The system as in claim 15, wherein the circuit drives the plurality of transmitting and receiving means collectively.

26. The system as in claim 15, wherein the circuit comprises: (i) a drive circuit operable to drive the plurality of transmitting and receiving means separately with separate drive signals; and (ii) a filter network, wherein the filter network is operable to distinguish the reflected signals from one another for subsequent calculation of liquid level at each of the locations of the transmitting and receiving means.

27. The system as in claim 15, wherein the circuit comprises: (i) a drive circuit operable to drive the transmitting and receiving means with at least one drive signal; and (ii) a filter network, wherein the filter network is operable to distinguish the reflected signals from one another for subsequent calculation of liquid level at each of the locations of the transmitting and receiving means.

* * * * *